US008006689B2

(12) United States Patent
Dol

(10) Patent No.: US 8,006,689 B2
(45) Date of Patent: Aug. 30, 2011

(54) REFLECTOR ASSEMBLY FOR ENERGY CONCENTRATORS

(76) Inventor: Edo Dol, Queensland (AU)

( * ) Notice: Subject to any disclaimer, the term of this patent is extended or adjusted under 35 U.S.C. 154(b) by 1000 days.

(21) Appl. No.: 11/792,226

(22) PCT Filed: Dec. 2, 2005

(86) PCT No.: PCT/AU2005/001823
§ 371 (c)(1),
(2), (4) Date: Sep. 5, 2007

(87) PCT Pub. No.: WO2006/058386
PCT Pub. Date: Jun. 8, 2006

(65) Prior Publication Data
US 2008/0230049 A1 Sep. 25, 2008

(30) Foreign Application Priority Data
Dec. 3, 2004 (AU) ................. 2004906923

(51) Int. Cl.
*F24J 2/10* (2006.01)
*H01L 31/042* (2006.01)
(52) U.S. Cl. ..... 126/692; 136/246; 343/912; 343/781 P; 343/781 CA
(58) Field of Classification Search .......... 343/912, 343/832, 834, 840, 781 R, 781 CA, 781 P; 126/692, 600, 685, 438; 136/246
See application file for complete search history.

(56) References Cited

U.S. PATENT DOCUMENTS

| 3,998,206 | A | | 12/1976 | Jahn | |
| 4,034,737 | A | | 7/1977 | Kume | |
| 4,340,031 | A | * | 7/1982 | Niedermeyer | ............... 126/600 |
| 4,458,251 | A | | 7/1984 | Bondon | |
| 4,743,095 | A | | 5/1988 | Dane | |
| 4,788,555 | A | * | 11/1988 | Schultz et al. | ............... 343/840 |
| 4,864,317 | A | * | 9/1989 | Sorko-Ram | ............... 343/720 |
| 7,084,836 | B2 | * | 8/2006 | Espenscheid et al. | ........ 343/914 |
| 7,138,958 | B2 | * | 11/2006 | Syed et al. | ................... 343/872 |

FOREIGN PATENT DOCUMENTS

| CN | 1050470 | 4/1991 |
| DE | 3200731 | 7/1983 |
| EP | 0 184 330 | 6/1986 |
| JP | 2003-74988 | 3/2003 |
| RU | 2084994 | 7/1997 |
| WO | 2006/058386 | 6/2006 |

* cited by examiner

*Primary Examiner* — Hoang V Nguyen
(74) *Attorney, Agent, or Firm* — Young & Thompson

(57) ABSTRACT

In an energy wave solar reflector assembly (12) for an energy concentrator (10), the assembly has a support structure (21) with support arms (22) extending from a central zone (24), and an array of concentric annular reflective elements (28) spacedly arranged on the support arms or on elongate mounting strips fixed to each or selected supported arms. The reflective elements having a reflective surface shaped to reflect incident energy waves, and a holding arrangement having holding devices (40, 74) arranged to hold the reflective elements in an orientation to direct the reflected energy waves thereof in a direction towards a focal zone (16) of the reflective elements.

26 Claims, 6 Drawing Sheets

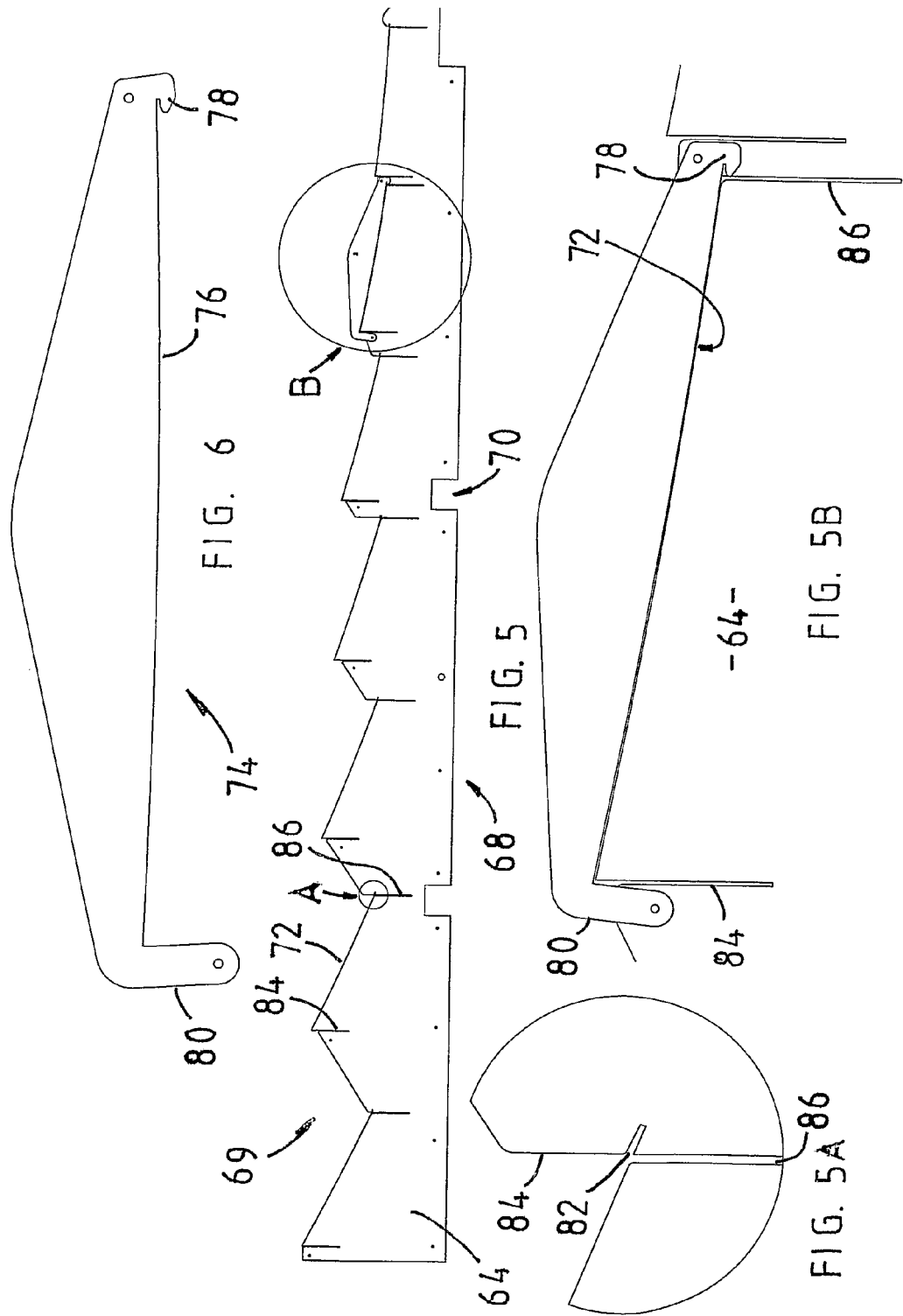

REFLECTOR ASSEMBLY FOR ENERGY CONCENTRATORS

TECHNICAL FIELD OF THE INVENTION

This invention relates to a reflector assembly for energy concentrators.

BACKGROUND OF THE INVENTION

Solar concentrators known to the inventor use mirrors on a relatively large surface to reflect sunlight onto a focal zone where a converter is located. The converters convert the solar energy into another form of useful energy such as electricity or heat. The surface is curved or parabolic in shape so that the incident sunlight is directed towards the corresponding focal zone. The reflective surface is usually formed of a single curved mirror or an array of curved mirrors fixed on a disc or trough shaped member.

As the surface needs to be relatively large in surface area, the disc or trough shaped member must also be large in size. Due to the size, it is difficult to fabricate such member with a portion thereof having a shape corresponding to that of the curved or parabolic reflective surface. Moreover, it takes considerable care to shape the mirror/mirrors so that they can be fitted together to form said shape. To fix them to the portion to form the reflective surface also requires considerable skill. Accordingly, the costs of manufacturing the prior art solar concentrators are generally high.

The mirror/mirrors are usually coated with a clear polymer material to protect them from the environment. But the material is affected by the ultra violet (UV) rays and it tends to degenerate progressively in time. The glass mirrors are susceptible to damage by hail storms.

If the mirror or some of the mirrors are damaged the concentrator would need to be removed from service so that repair work can be carried out.

Satellite antennae are concentrators for concentrating radio wave energy from satellites. They also have a curved or parabola shaped metallic disc for concentrating or reflecting radio wave energy towards a low noise blocking converter (LNB) located at a focal zone over the disc. Thus satellite antennae also have some of the difficulties relating to the use of a large reflective surface in the solar concentrators.

The prior art concentrators are relatively high and are susceptible to damage by high wind. In addition, they are relatively heavy and as such require a relatively strong support structure and a relatively high powered motor to cause them to move.

Object of the Present Invention

An object of the present invention is to alleviate or to reduce to a certain level one or more of the above prior art disadvantages.

Outline of the Present Invention

In one aspect therefore, the present invention resides in a reflector assembly for an energy concentrator. The assembly comprises a support structure having a plurality of support arms, and a reflective arrangement having an array of concentric annular reflective elements spacedly arranged on the support arms or on elongate mounting strips fixed to each or selected supported arms, each said reflective element having a reflective surface shaped to reflect incident energy waves, and holding arrangement arranged to hold the reflective elements in orientations to direct the reflected energy waves thereof in a direction towards a focal zone of the reflective arrangement.

In preference, each said reflective element is formed with a curved surface configured to reflect the incident energy waves towards the focal zone. Preferably, the reflective elements are configured with dimensions that are incremental radially outwardly. It is further preferred that each said reflective element is preformed with said curve surface. Alternatively, the support arms or the mounting strips are configured to shape said reflective elements to form said curved surface. Preferably, each said support arm or mounting strip has a top edge arranged with spaced curved edge portions and the curved edge portions of the mounting strips are arranged to align in respective circumferential paths for mounting and shaping said concentric reflective elements to form said curved surface.

The reflective elements may have a ring or oval shape.

Preferably, the reflective surface of each reflective element has a relatively shallow concave shape for reflecting incident energy waves towards the focal zone.

More preferably, the reflective elements are fabricated from a metallic sheet material having a relatively high reflective index. Typically, the metallic material is stainless steel. The reflective elements may be cuttings from a sheeting of the metallic material and the cuttings are formed with a surface having said shallow concave shape.

The holding arrangement may have a set of holding devices for holding each reflective element on the support arms or mounting strips. Each holding device may have a first holding member arranged to be fixed to a support arm or mounting strip, and a second holding member secured to said first holding member and arranged to engage with a part of an adjacent reflective element. The first holding member may also have an engagement face arranged to engage with another part of the adjacent reflective element.

It is preferred that each holding device is arranged so that the second holding member is adjustably movable relative to the first holding member. The first holding member may have a curved outer face and the second holding may have a compatible curved inner face arranged to engage with said outer face. More preferably, said inner and outer faces have compatible toothed profiles whereby parts of the toothed profiles can inter fit for limiting movement therebetween.

The first holding member may have an aperture for receiving a fixing member and the second holding may have a slot through which the fixing member extends. The slot may be arranged to allow the second holding member to be adjustably positioned to engage the adjacent reflective element. Preferably, said fixing member is arranged to fix the engagement device to a corresponding support arm or mounting strip. The fixing member may be a screw or a bolt for cooperating with a locking nut.

The support structure may further include an orientation arrangement for mounting each said reflective element at said orientation. Said orientation arrangement preferable includes paired mounting elements arranged to mount each reflective element at said orientation. The paired mounting elements may be in the form of paired circular rings associated with said support arms or said mounting strips, and dimensioned to mount each reflective element at said orientation. Each said mounting strip may have spaced vertical slots arranged to receive said mounting elements. The spaced vertical slots of the mounting strips are preferably arranged to align in respective circumferential paths.

Each reflective element may have an inner edge and an outer edge and each said holding device may have a first end arranged for connection to each said support arm or mounting strip and a second end arranged to engage each reflective element to thereby hold the engaged reflective element in position. Preferably, said second end is hook shaped and arranged to engaged said inner or outer edge of each reflective element. Each holding device may have a lower edge for engagement with each reflective element and the lower edge is shaped to cooperate with said support arm or mounting strip to form said curved surface of the reflective elements. Each said mounting strip may have spaced retention notches arranged to receive said inner or outer edges of the reflective element.

In preference, each said support arm or mounting strip has a substantially saw tooth shaped upper edge with angled edge portions for mounting the reflective elements.

In another aspect therefore, the present invention resides in a solar concentrator comprising the aforementioned reflector assembly and an energy collector for converting the reflected light into another form of energy.

The collector may be arranged at said focal zone at which it receives the reflected light from the reflective elements. Extension arms for supporting the collector at said focal zone may be fitted to selected support arms. Alternatively, the collector may be arranged below said focal zone and a secondary mirror arranged at said focal zone to redirect the reflected light towards the converter. It is preferred that the collector is located at said central zone. The collector may also be located in a remote location and a conveying arrangement being provided to convey said reflected energy to the collector.

The concentrator is therefore relative low in profile. The concentrator can be easily moved into a substantially horizontal position to minimise damage at times of relatively high wind. A tracker may be arranged to position the concentrator in according to sun position. The tracker may have a wind sensor and the tracker is arranged to position the concentrator to a substantially horizontal position when the sensor detects a wind speed higher than a predetermined value.

BRIEF DESCRIPTION OF THE DRAWINGS

In order that the present invention can be more readily understood and be put into practical effect reference will now be made to the accompanying drawings which illustrate non-limiting embodiments of the present invention and wherein:—

FIG. 5 is a side view of the mounting strip of the mounting arrangement shown in FIG. 4;

FIGS. 5A and 5B show details of the respective sections indicated as A and B of the mounting strip shown in FIG. 5;

FIG. 6 is a side view of the holding device for use with the mounting strip shown in FIG. 5.

DETAILED DESCRIPTION OF THE INVENTION

Figure 1:
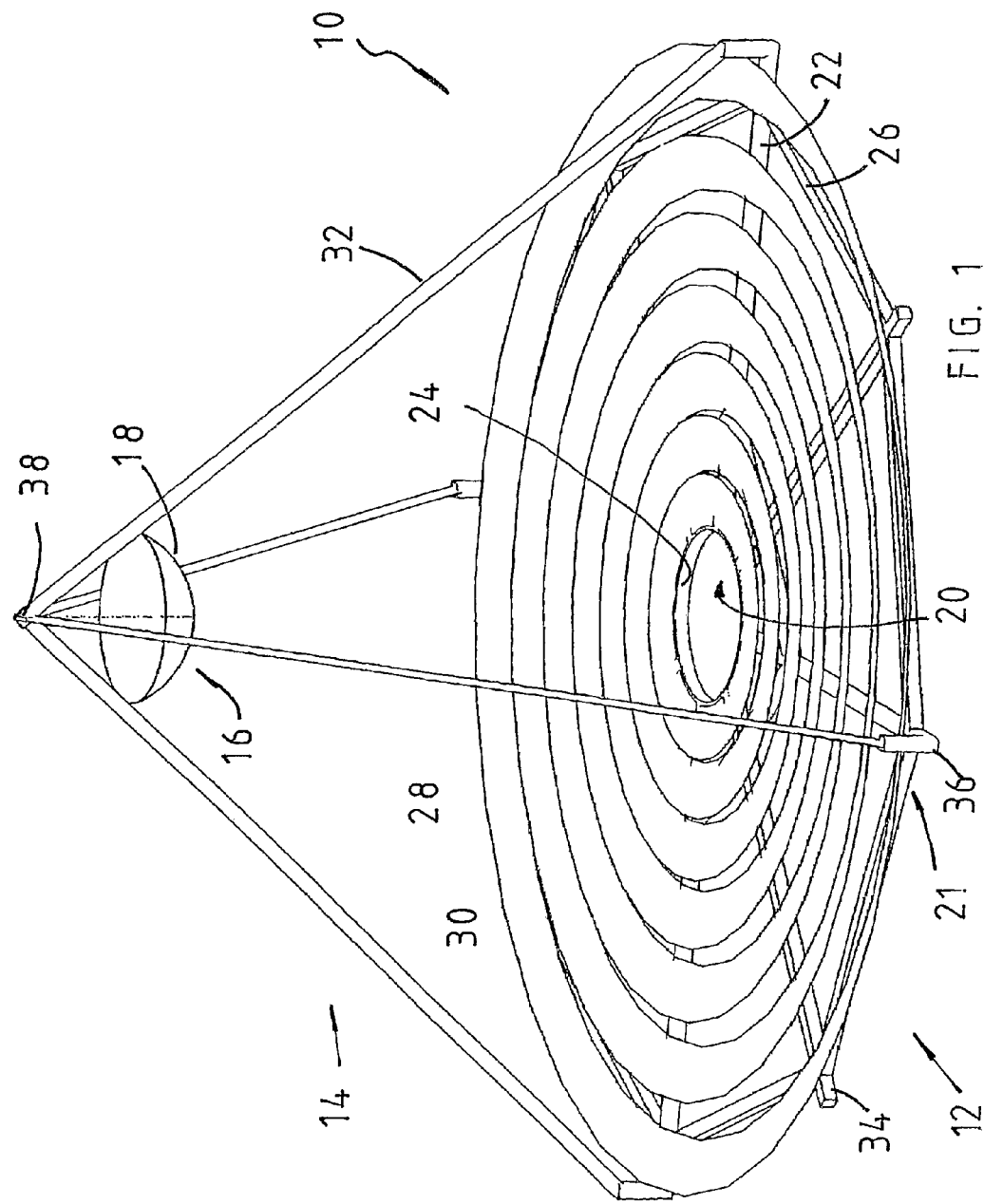
FIG. 1 is a perspective view of a schematic diagram of a solar concentrator according to one embodiment of the present invention.

Referring to FIG. 1, there is shown an embodiment of the solar concentrator 10 according to the present invention. The concentrator 10 has a reflector assembly 12 for reflecting incident light towards a focal zone 16 and a collector assembly 14 having a collector or secondary reflector 18 arranged at the focal zone 16. If the secondary reflector 18 is at the focal zone 16 then the collector (not shown) is located at a central zone 20 where it receives light redirected by the secondary reflector 18.

The reflector assembly 12 has a support structure 21 with support arms 22 extending radially from the central zone 20 and connection bars 24 and 26 interconnect the inner and outer ends of adjacent support arms 22. An array of concentric ring-shaped reflecting elements 28 are spacedly arranged on the support arms 22. Each element 28 has a slightly concave reflective face 30 configured to reflect incident light. The reflecting elements 28 are oriented to direct the reflected light towards the focal zone 16. The elements 28 are fabricated from stainless steel sheetings.

The collector assembly 14 has extension arms 32 with lower ends thereof connected to the outer ends 34 of selected the support arms 34 by means of connectors 36. Upper ends 38 of the extension arms 32 are fixed together just above the focal zone 16. The collector/secondary mirror 18 is fixed to the extension arms 32.

Figure 2:
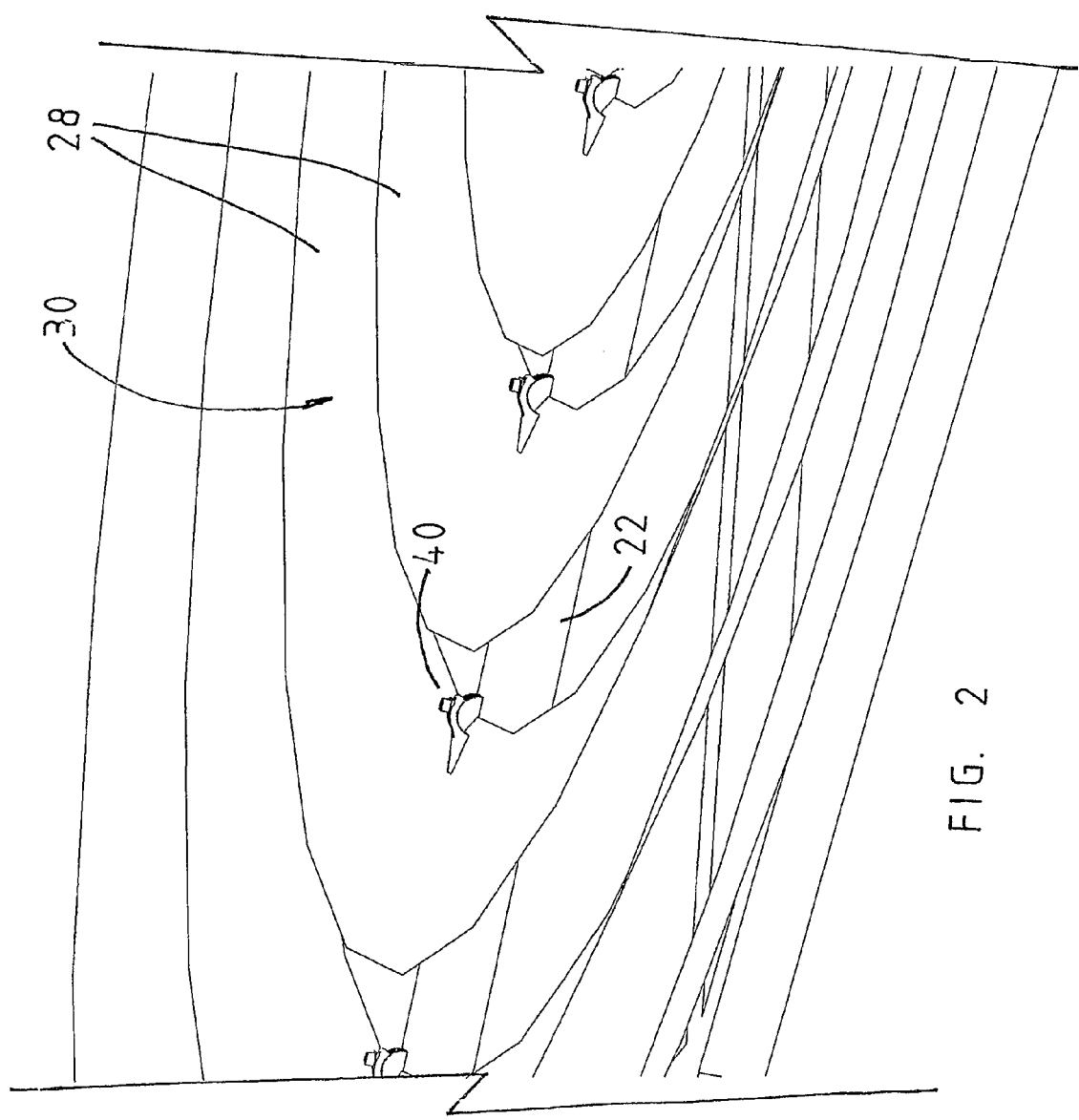
FIG. 2 is a partial perspective view of a schematic diagram illustrating a form of the holding arrangement for the concentrator shown in FIG. 1.
Figure 3:
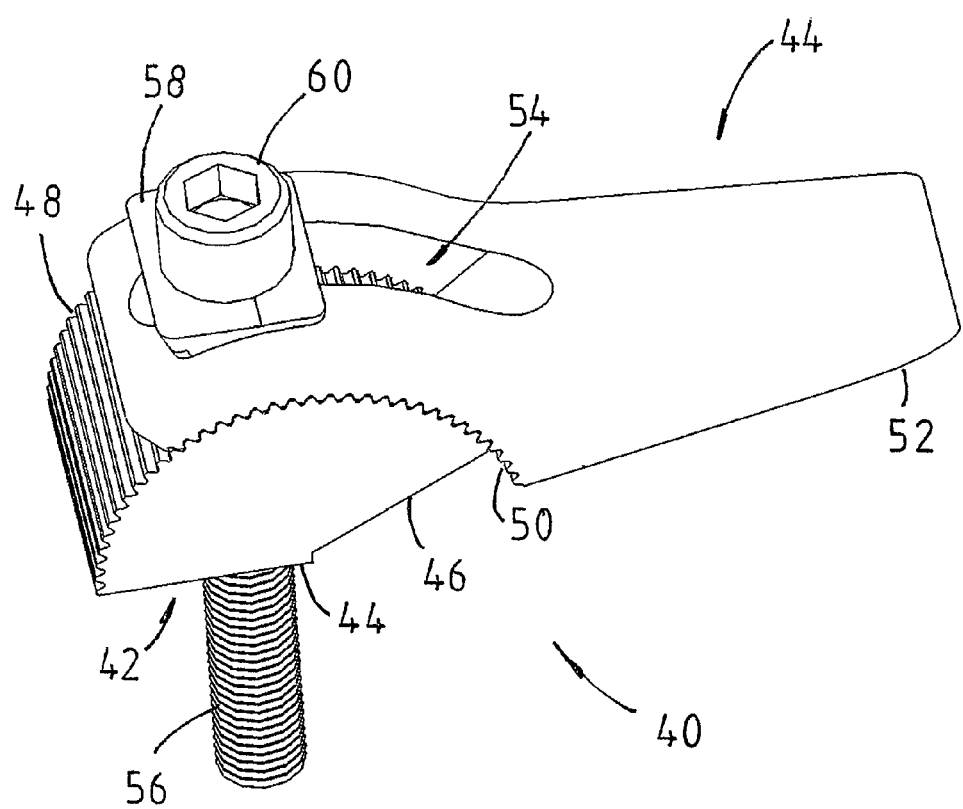
FIG. 3 is a perspective view of one of the holding devices of the holding arrangement shown in FIG. 2.

Turning to FIG. 2, the reflecting elements 28 are held by a holding arrangement for holding them in an orientation for directing the reflected light towards the focal zone 16. In this embodiment the holding arrangement has a set of holding devices 40 arranged to hold and retain each of the reflection elements 28 on the arms 22. As can be seen clearer in FIG. 3, each holding device 40 has a lower holding member 42 cooperating with an upper holding member 44. The lower member 42 includes a flat under face 44 for engaging a corresponding support arm 22 and an angled lower face 46 for engaging a part of the concave face 30 of an adjacent reflecting element 28. The upper face 48 of the lower member 42 is curved and has a toothed profile.

The upper member 44 has a curved lower face 50 with a corresponding toothed profile for inter engaging with the toothed profile of the lower member 42, and an extension 52 arranged to engage another part of the element 28. Thereby, the holding devices 40 hold the engaged reflecting elements in position.

The upper member 44 has a relatively large slot 54 so that its position relative to the lower member 42 can be adjusted. In this position, the upper member 44 is fixed thereat by tightening a screw 56 inserted through a hole (not shown) in the lower member 42. The upper member 44 thus provides adjustability of the orientation of the reflecting elements 28. The screw 56 can be tightened by an appropriate tool (not shown) for fixing the device 40 to the support arm 22. To protect the upper member 44, a washer 58 with a curved face is provided between the upper member 44 and the head 60 of the screw 56.

Figure 4:
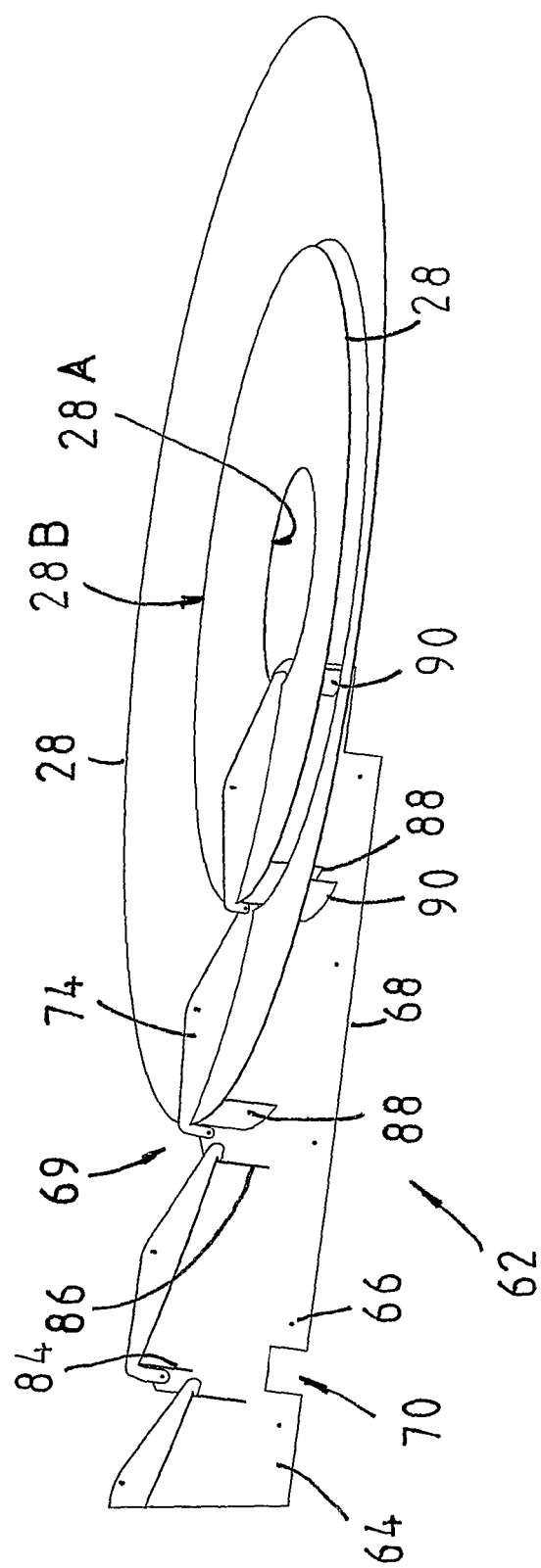
FIG. 4 is a partial perspective view of a schematic diagram illustrating a mounting strip with another form of the holding arrangement for the concentrator shown in FIG. 1.

Referring to FIG. 4, this embodiment of the concentrator 10 has its holding arrangement provided with a series of substantially saw shaped mounting strips 62 (one only shown) radiating from the central zone 20 and fixed to associated support arms 22. Each mounting strip 62 has an elongate body 64 with guide holes 66 arranged adjacent to lower edge 68 thereof for guiding screws or similar fixing elements for fixing the strips to associated support arms 22. The body 64 also has slots 70 at its lower edge 68 for receiving reinforcing bars (not shown) interconnecting the support arms 22.

The upper edge 69 of the body 64 is substantially saw tooth shaped having angled edge portions 72 arranged for supporting the reflecting elements 28. The edge portions 72 are configured for shaping the reflecting elements 28, and for this purpose they have a shallow concave recess. Holding devices 74 each with a corresponding convex engagement edge 76 are arranged to hold the reflecting elements 28 in position. Each holding device 74 has a hook-shaped end 78 for engaging an inner edge 28A of the associated reflective element 28, and an L-shaped end 80 for fixing to the body 64. A retention notch 82 at each vertical edge portion 84 of the upper edge 69 receives the inner edge 28A of the reflecting element 28 held at the adjacent edge portion 72. Accordingly, the reflecting elements 28 are positively held to the edge portions 72. The concave edge portions 72 and the corresponding convex edge of the holding devices 74 also press and thereby shape the reflecting elements 28 to form a shallow concave shape. FIG. 5B shows a single holding device 74 having its L-shaped end pivotally connected to the body 64, and its hook-shaped end 78 in position for engaging the inner end 28A of a reflecting element 28. Note that the outer end 28B of the reflecting element 28 also engages the L-shaped end 80.

The support structure 21 also has an orientation arrangement for ensuring that the reflecting elements 28 are in an orientation to direct reflected light towards the focal zone 16. In the embodiment shown in FIGS. 4 to 6, the orientation arrangement has vertical slots 84 and 86 on either side of each holding edge portion 72 into which orientation rings ed 88 and 90 are inserted. The rings 88 and 90 are dimensioned to engage portions of the reflective elements 28 adjacent to respective outer end 28B and inner end 28A thereof to cause them to be positioned in an orientation to direct the reflected light towards the focal zone 16.

The concentrator 10 has its dome shaped secondary reflector 18 positioned at the focal zone 16 to redirect reflected light from the reflective elements 28 to energy consuming or storage devices which either can use the light energy or in another form of energy convertible from the light energy. These devices may be located in the path of the redirected reflected light or remotely from the reflector assembly 12. Where the devices are located remotely, conveying means are used to convey the light energy or the converted energy to them. The concentrator 10 can be used to concentrate solar energy as well as radio wave energy, and can be adapted for a number of diverse technical fields, such as the followings:

---

Telecommunications
Water pumping
Water heating
Oil heating -                  To heat a cooktop for cooking.
                               As heat for refrigeration
                               As heat for airconditioning
                               In a heat exchanger to heat water
                               Drying room
Heating/running a sterling engine
Powering/running a closed cycle gas turbine
Powering/running a small auto type turbocharger

---

Figure 7:
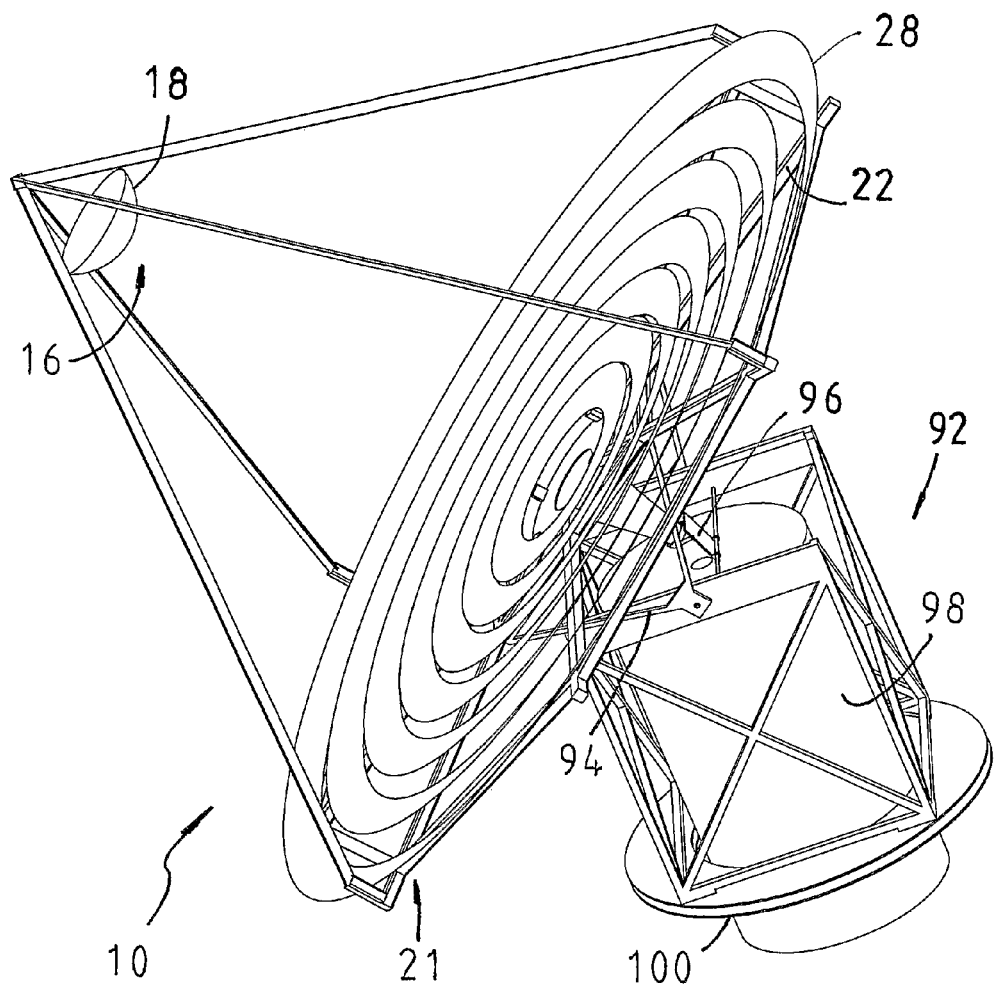
FIG. 7 is a perspective view of one form of the solar concentrator according to the present invention.

FIG. 7 shows a specific application of the solar concentrator 10. The solar concentrator 10 shown in FIG. 7 has a support frame 92 connected to support arms 22 of the support structure by means of link members 94. A selectively positionable reflector 96 is positioned direct the reflected light from the secondary reflector 18 into a thermal energy tank 98 supported in the frame 92. The tank 98 contains a material which is heated by the light and stores it as thermal energy. The angle of the reflector 96 is variable and can be linked to the reflector assembly 12 so that its angle adjusted with any adjustment made to the assembly 12. The frame 92 is fixed a solar tracking frame 100 (partially shown) so that orientation of the concentrator 10 is varied with the position of the sun.

Whilst the above has been given by way of illustrative example of the present invention many variations and modifications thereto will be apparent to those skilled in the art without departing from the broad ambit and scope of the invention as herein set forth in the following claims.

The invention claimed is:

1. A reflector assembly for an energy concentrator comprising a support structure having a plurality of support arms, and a reflective arrangement having an array of concentric annular reflective elements spacedly arranged on the support arms or on elongate mounting strips fixed to each or selected supported arms, each said reflective element having a reflective surface shaped to reflect incident energy waves, and a holding arrangement arranged to hold the reflective elements in an orientation to direct the reflected energy waves thereof in a direction towards a focal zone of the reflective arrangement, said holding arrangement having a set of holding devices for holding each reflective element on the support arms or mounting strips; each holding device having a first holding member fixed to a support arm or mounting strip and adapted to engage with a part of an adjacent reflective element, and a second holding member having an engagement face adapted to engage with another part of the adjacent reflective element and adjustably positionable relative to the first holding member so that when secured to said first holding member the engagement face thereof causes said adjacent reflective element to be at said orientation, the first holding member having a curved outer face and the second holding member having a compatible curved inner face arranged to engage with said outer face, and said inner and outer faces having compatible toothed profiles whereby parts of the toothed profiles can inter fit for limiting movement therebetween.

2. The assembly according to claim 1 wherein each said reflective element is formed with a curved surface configured to reflect the incident energy waves towards the focal zone.

3. The assembly according to claim 2 wherein each said reflective element is preformed with said curve surface.

4. The assembly according to claim 1 wherein the reflective elements are configured with dimensions that are incremental radially outwardly.

5. The assembly according to claim 1 wherein the reflective elements are configured in a ring or oval shape.

6. The assembly according to claim 1 wherein the reflective surface of each reflective element has a relatively shallow concave shape for reflecting incident energy waves towards the focal zone.

7. The assembly according to claim 1 wherein the reflective elements are fabricated from a metallic sheet material having a relatively high reflective index.

8. The assembly according to claim 7 wherein the reflective elements are cuttings from a sheeting of the metallic material.

9. The assembly according to claim 1 wherein the first holding member has an aperture for receiving a fixing member and the second holding member has a slot through which the fixing member extends, the slot being configured to allow the second holding member to be adjustably positioned to engage the adjacent reflective element, and said fixing member is arranged to fix the engagement device to a corresponding support arm or mounting strip.

10. The assembly according to claim 1 wherein the support structure further includes an orientation arrangement for mounting each said reflective element at said orientation, and said orientation arrangement includes paired mounting elements arranged to mount each reflective element at said orientation.

11. The assembly according to claim 10 wherein each said mounting strip has spaced vertical slots arranged to receive said mounting elements 12. The assembly according to claim 10 wherein the paired mounting elements are in the form of paired circular rings associated with said support arms or said mounting strips, and dimensioned to mount each reflective element at said orientation.

13. A solar concentrator comprising the reflector assembly as claimed in claim 1 and an energy collector for receiving and converting the reflected light into another form of energy.

14. The concentrator according to claim 13 wherein the collector is arranged at said focal zone at which it receives the reflected light from the reflective elements; or below said focal zone and a secondary mirror arranged at said focal zone to redirect the reflected light towards the collector.

15. The concentrator according to claim 14 wherein the collector is located in a remote location and a conveying arrangement being provided to convey said reflected energy to the collector.

16. A reflector assembly for an energy concentrator comprising a support structure having a plurality of support arms, and a reflective arrangement having an array of concentric annular reflective elements spacedly arranged on the support arms or on elongate mounting strips fixed to each or selected supported arms, each said reflective element having a reflective surface shaped to reflect incident energy waves, and a holding arrangement arranged to hold the reflective elements in an orientation to direct the reflected energy waves thereof in a direction towards a focal zone of the reflective arrangement, each said reflective element being formed with a curved surface configured to reflect the incident energy waves towards the focal zone and each said holding device having a first end arranged for connection to each said support arm or mounting strip and a second end arranged to engage each reflective element to thereby hold the engaged reflective element in position, each said support arm or mounting strip having a substantially saw tooth shaped upper edge with angled edge portions for mounting the reflective elements.

17. The assembly according to claim 16 wherein each reflective element has an inner edge and an outer edge, and said second end is hook shaped and arranged to engage said inner or outer edge of each reflective element.

18. The assembly according to claim 17 wherein each said mounting strip has spaced retention notches arranged to receive said inner or outer edges of the reflective elements.

19. The assembly according to claim 16 wherein each holding device has a lower edge for engagement with each reflective element and the lower edge is shaped to cooperate with said support arm or mounting strip to form said curved surface of the reflective elements.

20. The assembly according to claim 16 wherein the support arms or the mounting strips are configured to shape said reflective elements to form said curved surface.

21. The assembly according to claim 20 wherein each said support arm or mounting strip has a top edge arranged with spaced curved edge portions and the curved edge portions of the mounting strips are arranged to align in respective circumferential paths for mounting and shaping said concentric reflective elements to form said curved surface.

22. The assembly according to claim 16 wherein the reflective elements are configured with dimensions that are incremental radially outwardly.

23. The assembly according to claim 16 wherein the reflective elements are configured in a ring or oval shape.

24. The assembly according to claim 16 wherein the reflective surface of each reflective element has a relatively shallow concave shape for reflecting incident energy waves towards the focal zone.

25. The assembly according to claim 16 wherein the reflective elements are fabricated from a metallic sheet material having a relatively high reflective index.

26. The assembly according to claim 25 wherein the reflective elements are cuttings from a sheeting of the metallic material.

* * * * *